US012650522B2

(12) United States Patent
Tourian et al.

(10) Patent No.: US 12,650,522 B2
(45) Date of Patent: Jun. 9, 2026

(54) METHOD FOR TAKING PROVIDED GNSS-RELEVANT ROUTE INFORMATION INTO ACCOUNT IN THE GNSS-BASED LOCALIZATION OF VEHICLES

(71) Applicant: Robert Bosch GmbH, Stuttgart (DE)

(72) Inventors: Mohammad Tourian, Stuttgart (DE); Jens Strobel, Freiberg am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 245 days.

(21) Appl. No.: 18/490,904

(22) Filed: Oct. 20, 2023

(65) Prior Publication Data

US 2024/0159914 A1    May 16, 2024

(30) Foreign Application Priority Data

Nov. 10, 2022    (DE) ..................... 10 2022 211 911.8

(51) Int. Cl.
*G01S 19/40*        (2010.01)
*G01S 19/39*        (2010.01)

(52) U.S. Cl.
CPC ............ *G01S 19/40* (2013.01); *G01S 19/396* (2019.08)

(58) Field of Classification Search
CPC ............................... G01S 19/40; G01S 19/396
USPC ...................................... 342/357.23
See application file for complete search history.

(56) References Cited

U.S. PATENT DOCUMENTS 11,073,622 B2 *    7/2021    Cohen ................... G01S 19/425

FOREIGN PATENT DOCUMENTS

| CN | 110988922 A | * | 4/2020 | ............. G01S 19/21 |
| CN | 113923775 A | * | 1/2022 | ............. H04W 64/00 |
| CN | 115267836 A | * | 11/2022 | ............. G01S 19/21 |
| CN | 118915097 A | * | 11/2024 | ............. G01S 19/40 |
| WO | WO-2021221842 A1 | * | 11/2021 | ............. H04W 40/24 |

* cited by examiner

*Primary Examiner* — Harry K Liu
(74) *Attorney, Agent, or Firm* — NORTON ROSE FULBRIGHT US LLP

(57)        ABSTRACT

A method for taking provided GNSS-relevant route information into account in the GNSS-based localization of vehicles. the method includes: receiving provided GNSS-relevant route information; evaluating at least a part of the GNSS-relevant route information; and taking into account at least one item of provided GNSS-relevant route information or a result of the evaluation of at least one item of provided GNSS-relevant route information during the determination or evaluation of one or more localization results.

8 Claims, 2 Drawing Sheets receive GNSS-relevant route information evaluate at least part of the GNSS-relevant route information take into account at least one item of GNSS-relevant route information or result of the evaluation a)    b)    c)

110    120    130

4

3    7

5

8

8,9

1    2

9

METHOD FOR TAKING PROVIDED GNSS-RELEVANT ROUTE INFORMATION INTO ACCOUNT IN THE GNSS-BASED LOCALIZATION OF VEHICLES

CROSS REFERENCE

The present application claims the benefit under 35 U.S.C. § 119 of German Patent Application No. DE 10 2022 211 911.8 filed on Nov. 10, 2022, which is expressly incorporated herein by reference in its entirety.

FIELD

The present invention relates to a method for taking provided GNSS-relevant route information into account in the GNSS-based localization of vehicles. In addition, a computer program for carrying out the method, a machine-readable storage medium comprising the computer program, and a system for the GNSS-based localization of a vehicle are specified. The present invention can in particular be used in GNSS-based localization systems for at least partially automated, autonomous or partially autonomous driving.

BACKGROUND INFORMATION

With the aid of the Global Navigation Satellite System (GNSS), it is possible to perform a geospatial position determination at any point on the Earth. A GNSS satellite orbits the Earth and sends coded signals, with the aid of which the GNSS receiver calculates the distance from the receiver to the satellite by estimating the time difference between the time of signal reception and the transmission time. The estimated distances to satellites can, for example, be converted by GNSS sensors into an estimate of the position of the receiver, provided enough satellites are being tracked (typically more than 5). Currently, there are more than 130 GNSS satellites orbiting the Earth, which means that usually 65 of them at most are visible within the local horizon.

In recent years, satellite-assisted position determination has experienced rapid development. In the early days of satellite navigation, GNSS receivers, in order to determine their position, had to rely on a single constellation of satellites in orbit, on either the American GPS system or the Russian GLONASS system. Today, with the European Galileo system and the Chinese Beidou system, the two original systems have been joined by further operational systems and multiple regional expansion systems. Today, the norm is GNSS receivers with a plurality of constellations which can simultaneously receive signals from all GNSS constellations in orbit. As a result, the receivers are able to track a larger number of satellites even when large parts of the sky are obscured, such as, for example, in urban (or actual) street canyons, which increases accuracy and shortens the time for position determination.

The quality of GNSS positioning has long benefited from commercial GNSS correction services. As a rule, providers of GNSS correction services monitor incoming GNSS signals via a network of base stations with precisely known positions and transmit customized correction information to end users for a fee.

The combination of multi-constellation and multi-band receivers with new GNSS correction methods in order to achieve accuracies in the centimeter range, and doing all this at significantly lower operating costs, is paving the way for new types of mass-market applications for highly accurate positioning in the centimeter range. However, GNSS continues to suffer from the following disadvantages: in order to determine position, receivers must ideally be located within visual range of the orbiting satellites. Indoors and in tunnels, services are impaired or even unavailable. With the aid of inertial sensors, dead-reckoning solutions extend the area of highly accurate position determination beyond the range of GNSS signals.

Despite the improvements due to inertial sensors, GNSS/INS-based localization sensors in automated driving systems can suffer, at least in some areas, from major position errors, in particular in urban street canyons, where GNSS measurements are typically disturbed by multipath signal propagation. Even on freeways, the performance of such GNSS/INS-based localization sensors deteriorates under bridges, in the vicinity of thickly vegetated areas, large noise protection walls, high trucks, etc.

The present invention provides a method and a system which, in particular, can support GNSS- or GNSS/INS-based localization sensors with prior information in order to be able to overcome the aforementioned disadvantages as well as possible.

SUMMARY

According to an example embodiment of the present invention, a method is provided for taking provided GNSS-relevant route information into account in the GNSS-based localization of vehicles, comprising at least the following steps:

a) receiving provided GNSS-relevant route information, b) evaluating at least a part of the GNSS-relevant route information, c) taking into account at least one item of received GNSS-relevant route information or a result of the evaluation of at least one item of received GNSS-relevant route information during the determination or evaluation of one or more localization results.

Steps a), b) and c) can be carried out, for example, at least once and/or repeatedly in the order indicated in order to carry out the method. Furthermore, steps a), b) and c), in particular steps b) and c), can be carried out at least partially in parallel or simultaneously. In particular, steps a), b) and c) can be carried out on the vehicle side or by means of a GNSS localization device or a system for the GNSS-based localization of a vehicle. The vehicles can be motor vehicles, such as automobiles, for example. The vehicles can be set up for an at least partially automated or autonomous driving mode. In a particularly advantageous way, the method can contribute to high-precision position determination with the aid of GNSS-related prior information which can be received in particular from an assistance system (external to the vehicle).

In step a), provided GNSS-relevant route information is received. According to an example embodiment of the present invention, the GNSS-relevant route information can be, for example, one or more items of GNSS availability information in the area of a geographical position and/or on a route section. The route information can, for example, contain a measure of the availability and/or quality of GNSS reception in the area of a geographical position and/or on a route section. The GNSS-relevant route information can be provided, for example, in the form of a digital map (2D or 3D) and/or in a database for the provision of geographic information. Alternatively or cumulatively, the GNSS-relevant route information can be provided, for example, as an additional layer of an (existing) digital feature map (HD map). Alternatively or cumulatively, the GNSS-relevant route information can be provided, for example, in an availability map and/or can be used to provide an availability map. In particular, the GNSS-relevant route information can be provided in the form of a digital map for describing GNSS-relevant route information and/or can be obtained from such a map.

In step b), at least a part of the GNSS-relevant route information is evaluated. For example, according to an example embodiment of the present invention, one or more items of GNSS-relevant route information for one or more geographical positions and/or for one or more route sections can be evaluated. The evaluation can in particular be carried out in order to obtain prior information about the GNSS reception to be expected, for example at a position and/or in a route section towards which the vehicle is moving. For example, data, such as data from a database and/or a digital map, can be evaluated in such a way that GNSS-relevant route information stored therewith or therein is determined for one or more geographical positions and/or for one or more route sections towards which the vehicle is moving, in particular so that prior information about the GNSS reception to be expected at the relevant position and/or in the relevant route section is determined.

In step c), at least one item of received GNSS-relevant route information or a result of the evaluation of at least one item of received GNSS-relevant route information is taken into account during the determination or evaluation of one or more localization results. In particular, according to an example embodiment of the present invention, the determination or evaluation of one or more localization results can take place on the basis of at least one item of prior information about the GNSS reception to be expected, which information is or has been determined using at least one item of received GNSS-relevant route information for a geographical position and/or for a route section towards which the vehicle is moving. In particular, a measure for adjusting the determination or evaluation of the localization result can be deployed for the determination or evaluation of one or more localization results on the basis of at least one item of received GNSS-relevant route information or a result of the evaluation of at least one item of received GNSS-relevant route information. In particular, the measure can be selected from a catalog of predefinable measures. The catalog can, for example, comprise a specific set of predefined measures. The measures can, for example, be one or more of the following: weighting of the GNSS influence; updating or non-updating of GNSS data; adjusting the confidence value (in particular the protection level); and/or adjusting the satellite selection.

According to an advantageous embodiment of the present invention, it is provided that the GNSS-relevant route information be obtained from a higher-level and/or vehicle-external management system. The management system can be a component of a vehicle-external assistance system or provide such a system. The management system can, for example, comprise one or more servers. Furthermore, the management system can comprise a cloud or be provided in the manner of a cloud. For example, the GNSS-relevant route information can be determined or have been determined using GNSS raw data which have been gathered by measurement vehicles during a plurality of measurement trips to spatial positions and/or route sections. The measurement vehicles can have transmitted the acquired GNSS raw data (in particular with associated geographical information about the relevant reception location) to the management system in order to determine the GNSS-relevant route information. GNSS raw data generally describe those data which are output directly by a GNSS receiving unit. The GNSS receiving unit can be, for example, one or more GNSS receivers which receive a GNSS satellite signal directly. A corresponding GNSS receiving unit is generally also referred to as a so-called "measurement engine".

According to a further advantageous embodiment of the present invention, it is provided that the GNSS-relevant route information contains at least one interference indicator for describing at least one interference influence on GNSS reception in the area of a geographical position and/or on a route section, and/or in step b) this is evaluated from the GNSS-relevant route information. The interference influence is usually (negative) influences on the signals or on the signal propagation of GNSS signals. Corresponding interference influences can be, for example, multipath propagations of signals and/or signal reflections or objects at which corresponding signal propagation interferences can occur. Furthermore, the interference influence can be a signal delay or signal deflection, as can occur, for example, in the atmosphere, in particular in the ionosphere.

According to an example embodiment of the present invention, the at least one interference indicator can, for example, comprise or describe one or more of the following indicators or parameters:

multipath propagation indicator
GNSS signal strength
indicators of high-frequency interference
number of satellites
horizontal dilution of precision (HDOP)
satellite distribution in relation to vehicle trajectory
continuity of signal reception.

According to a further advantageous embodiment of the present invention, it is provided that, in step c), a weighting of the GNSS influence on at least one localization result is carried out on the basis of a received item of GNSS-relevant route information or a result of the evaluation of a received item of GNSS-relevant route information. For example, in this context, the influence of the GNSS data on position determination can be given a lower weighting or possibly entirely neglected. For example, the influence of GNSS-independent vehicle sensors on the at least one localization result can be given a higher weighting (as a counterweight, so to speak) when the influence of the GNSS data is given a lower weighting, or vice versa. The GNSS-independent vehicle sensors can, for example, be inertial sensors and/or environment sensors. For example, the observation of satellites in a specific azimuth range and/or in a specific elevation range can be weighted less heavily on the basis of prior information about the environment. For example, the variance of the GNSS measurements can be boosted for the weighting in order to obtain a lower weighting when estimating the localization result.

According to a further advantageous embodiment of the present invention, it is provided that, in step c), an updating or non-updating of GNSS data is carried out in a localization filter on the basis of a received item of GNSS-relevant route information or a result of the evaluation of a received item of GNSS-relevant route information. For example, an input of the localization filter, such as a Kalman filter, can be controlled, in particular for example briefly blocked, on the basis of the received item of GNSS-relevant route information or the result of the evaluation of a received item of GNSS-relevant route information.

According to a further advantageous embodiment of the present invention, it is provided that, in step c), a confidence value for describing the reliability of a localization result is adjusted on the basis of a received item of GNSS-relevant route information or a result of the evaluation of a received item of GNSS-relevant route information. The confidence value can preferably be a so-called protection level, which in particular describes, with a predefinable minimum probability, the (spatial) area in which the position solution is actually located. This area can, for example, be enlarged or increased if an impairment of GNSS reception is to be expected.

According to a further advantageous embodiment of the present invention, it is provided that, in step c), a satellite selection is carried out on the basis of a received item of GNSS-relevant route information or a result of the evaluation of a received item of GNSS-relevant route information. For example, certain satellites can be selected from a large number of GNSS satellites that are in principle more accessible. For example, a so-called tracking intelligence provider (TIP) can be updated to take into account a contaminated azimuth and/or elevation range. In particular, satellites in a contaminated azimuth or elevation range can be given a poor rating and can thus be sorted downwards, for example, in a list of all available satellites, in order to advantageously achieve a better localization performance. This can advantageously also contribute to receiver autonomous integrity monitoring (RAIM), which describes a method for checking the signal integrity of global navigation satellite systems (GNSS).

According to a further aspect of the present invention, a computer program for carrying out a method presented here is provided. In other words, this relates in particular to a computer program (product) comprising commands which, when the program is executed by a computer, cause the computer to carry out a method disclosed herein.

According to a further aspect of the present invention, a machine-readable storage medium is provided, on which the computer program disclosed herein is stored. The machine-readable storage medium is usually a computer-readable data carrier.

According to a further aspect of the present invention, a system for the GNSS-based localization of a vehicle is specified, which system is set up to carry out a method disclosed herein. The system can be provided and set up, for example, for a motor vehicle, such as an automobile. The vehicle can, for example, be configured for an at least partially automated or autonomous driving mode. The system can, for example, comprise a computer and/or a control device (controller) which can execute commands in order to carry out the method. For this purpose, the computer or the control device can, for example, run the specified computer program. For example, the computer or the control device can access the specified storage medium in order to be able to run the computer program.

According to an example embodiment of the present invention, the system can comprise, for example, a receiving module for receiving provided GNSS-relevant route information. The system can, for example, comprise an evaluation module for evaluating at least a part of the GNSS-relevant route information. The system can, for example, comprise a localization module for determining localization results, such as the position, speed, and/or orientation of a vehicle. In addition, the localization module can be provided and set up to take into account at least one item of received GNSS-relevant route information or a result of the evaluation of at least one item of received GNSS-relevant route information during the determination or evaluation of one or more localization results.

The details, features and advantageous example embodiments of the present invention discussed in connection with the method can also be correspondingly present in the computer program and/or the storage medium and/or the system presented here, and vice versa. In this respect, reference is made in full to the statements made there for a more detailed characterization of the features.

The solution presented here and its technical environment are explained in more detail below with reference to the figures. It should be noted that the present invention is not intended to be limited by the exemplary embodiments shown. In particular, unless explicitly shown otherwise, it is also possible to extract partial aspects of the facts explained in the figures and to combine them with other components and/or findings from other figures and/or the present description.

DETAILED DESCRIPTION OF EXAMPLE EMBODIMENTS

Figure 1:
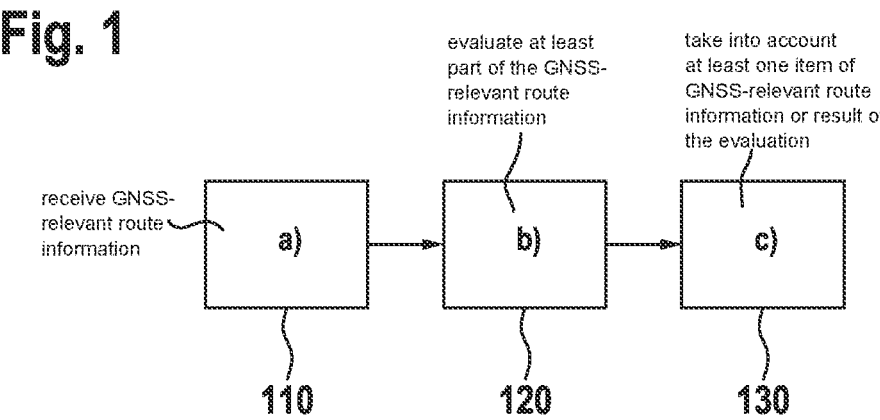
FIG. 1 shows an exemplary sequence of a method according to an example embodiment of the present invention.

FIG. 1 schematically shows an exemplary sequence of the method presented here. The method serves for taking provided GNSS-relevant route information 1, 2 into account in the GNSS-based localization of vehicles 3. The sequence of steps a), b) and c) shown by the blocks 110, 120, and 130 is an example and, in order to carry out the method, can be run through, for example, at least once in the sequence shown.

In block 110, according to step a), the provided GNSS-relevant route information 1, 2 is received. In block 120, according to step b), at least a part of the GNSS-relevant route information 1, 2 is evaluated. In block 130, according to step c), at least one item of received GNSS-relevant route information 1, 2 or a result of the evaluation of at least one item of received GNSS-relevant route information 1, 2 is taken into account during the determination or evaluation of one or more localization results.

Figure 2:
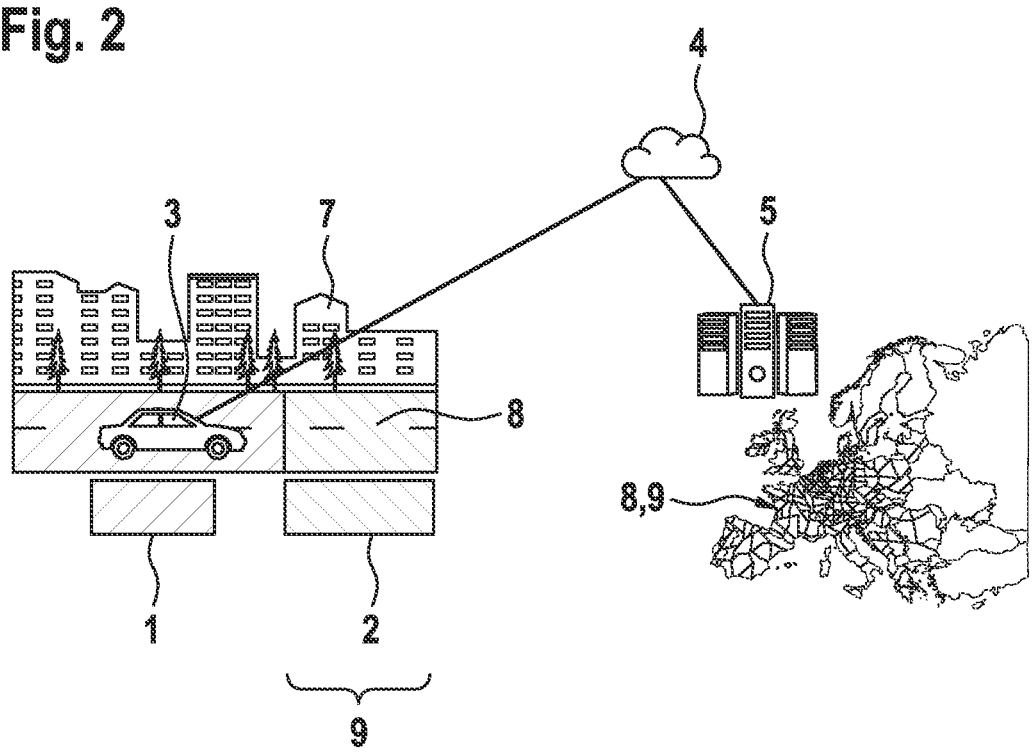
FIG. 2 shows an exemplary illustration of an application of the method according to an example embodiment of the present invention.

FIG. 2 schematically shows an exemplary illustration of an application of the method described here. In FIG. 2 in this context a vehicle 3 is shown by way of example, which vehicle is moving in an environment in which GNSS-relevant route information 1, 2 is available. The GNSS-relevant route information 1, 2 is provided here by way of example by a cloud 4 implemented by means of servers 5. In the example shown, an item of GNSS-relevant route information 2 is transmitted to the vehicle 3 as prior information about the GNSS reception to be expected at an upcoming geographical position 8 or in a corresponding route section 9. The prior information can describe an interference influence 7 (here, for example, multipath signal propagation by signal reflection on buildings) on GNSS reception in the area of the geographical position 8 and/or on the route section 9. For this purpose, the prior information can, for example, include an interference indicator 6.

The application example illustrated in FIG. 2 thus represents, on the one hand, an example of and possibly how the GNSS-relevant route information 1, 2 can be obtained from a higher-level and/or vehicle-external management system 4, 5.

Furthermore, this also illustrates an example of and possibly how the GNSS-relevant route information 1, 2 can include at least one interference indicator 6 for describing at least one interference influence 7 on GNSS reception in the area of a geographical position 8 and/or on a route section 9.

The at least one interference indicator 6 can, for example, comprise or describe one or more of the following indicators or parameters:

multipath propagation indicator
    GNSS signal strength
    indicators of high-frequency interference
    number of satellites
    horizontal dilution of precision (HDOP)
    satellite distribution in relation to vehicle trajectory
    continuity of signal reception.

Figure 3:
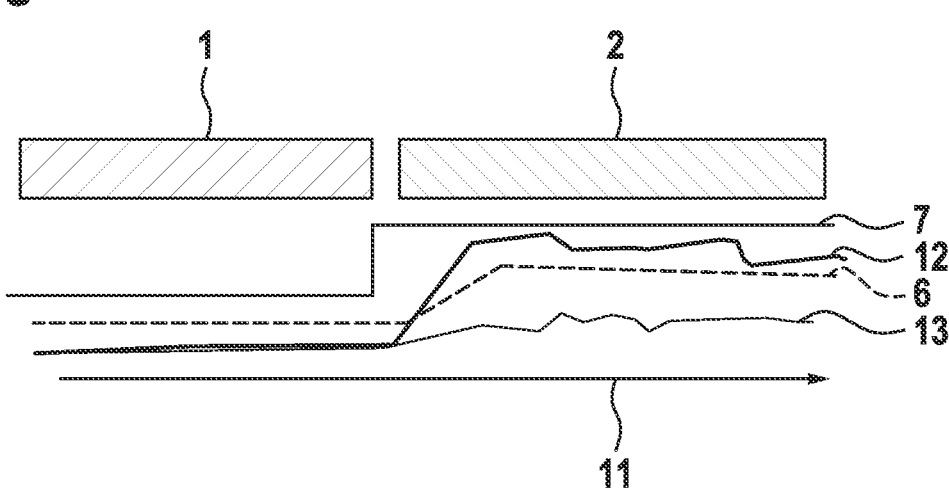
FIG. 3 shows an exemplary illustration of parameter profiles in order to explain advantages of the method according to an example embodiment of the present invention.

In order to explain advantages of the method, FIG. 3 schematically shows an exemplary illustration of parameter profiles. In FIG. 3, in particular the progressions of a first position error 12 and of a second position error 13 are plotted over time 11. The first position error 12 describes an error in the position solution or in the localization result, such as can occur, for example, when prior information for GNSS reception, which can advantageously be provided by the method described here, is not taken into account. It can be seen that the first position error 12 increases significantly after an instance of interference 7, which is, for example, assumed to be binary.

By means of the method described here, an interference indicator 6 can advantageously be provided as prior information about the GNSS reception to be expected. FIG. 3 shows by way of example that it can also rise in the region in which the interference 7 is present. The interference indicator 6 can be taken into account in the determination of the localization solution, for example by the influence of the GNSS data on the position determination being given a lower weighting or entirely neglected. Accordingly, the use of the method can advantageously result in a second position error 13 which, in the region of the fault 7, can also be smaller than the first position error 12.

In a particularly advantageous embodiment of the method, available GNSS-relevant prior information can be obtained from a vehicle-external assistance system and used in order to improve localization accuracy. The assistance system can be formed, for example, by means of the management system 4, 5. The assistance system can determine and provide previous GNSS-relevant route information 1, 2 on the basis of a plurality of measurement trips. During the measurement trips, for example, GNSS raw data can be collected and transmitted to the assistance system preferably together with associated location information. The assistance system can thus advantageously have a database of roads and routes, with data which can represent the performance of a GNSS/INS-based localization sensor. Such prior data can be transmitted online and/or via radio from the assistance system, provided for example via a cloud server, to a plurality of GNSS/INS-based localization sensors in vehicles 3 in order to be able to contribute there to improving the localization accuracy.

Figure 4:
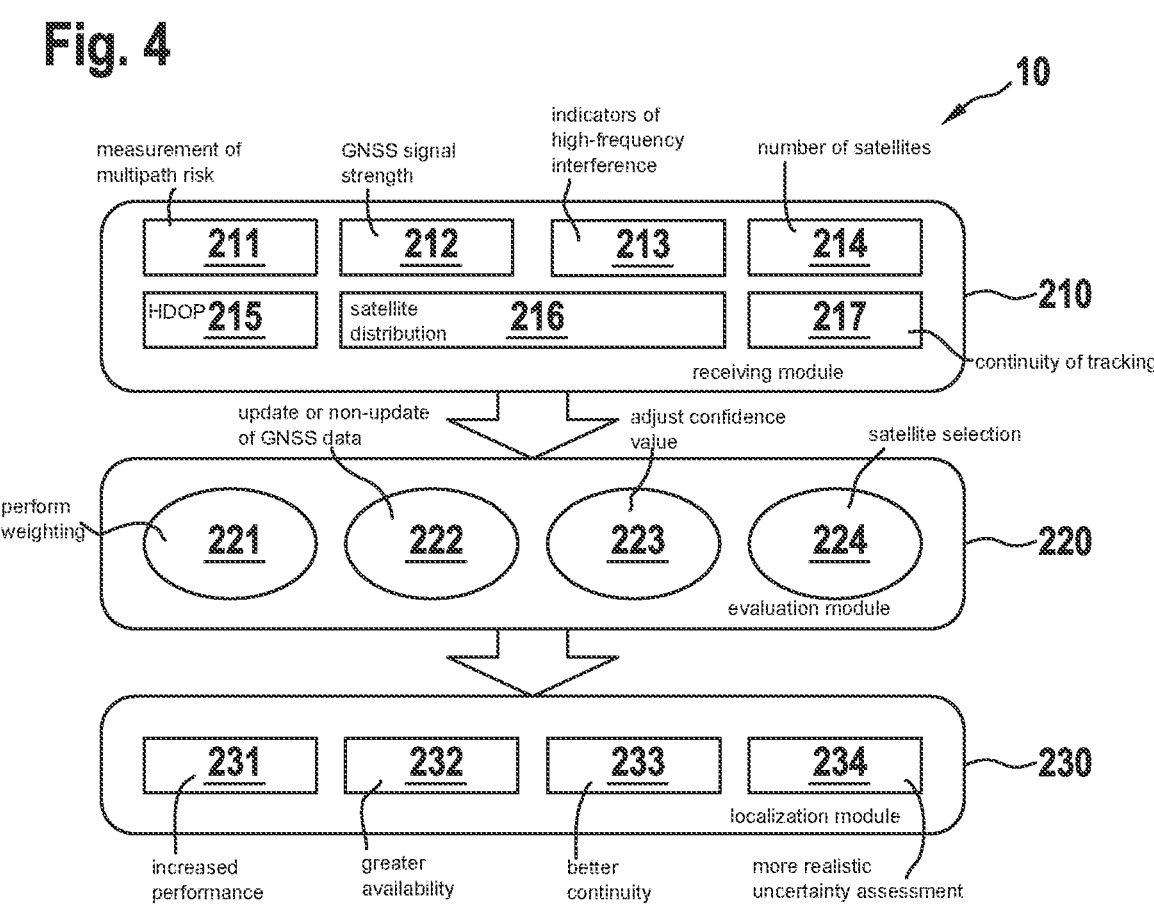
FIG. 4 shows an exemplary structure of a system for carrying out the method according to an example embodiment of the present invention.

FIG. 4 schematically shows an exemplary structure of a system 10 for GNSS-based localization of a vehicle 3, which system is set up to carry out the method described here. The system 10 has, for example, a receiving module 210 for receiving provided GNSS-relevant route information 1, 2. The GNSS-relevant route information 1, 2 can, for example, comprise or describe one or more interference indicators 6. The at least one interference indicator 6 can, for example, comprise or describe one or more of the following indicators or parameters: measurement of the multipath risk 211; GNSS signal strength 212; indicators of high-frequency interference 213; number of satellites 214; horizontal dilution of precision (HDOP) 215; satellite distribution in relation to vehicle trajectory 216; and/or continuity of tracking 217.

The system 10 here also has, for example, an evaluation module 220 for evaluating at least a part of the GNSS-relevant route information 1, 2. The evaluation module 220 can, for example, select one or more measures for adjusting the determination or evaluation of the localization result, depending on the GNSS-relevant route information 1, 2. For example, the following measures can be selected here:

In block 221, as a measure, for example, a weighting of the GNSS influence on at least one localization result can be performed on the basis of a received item of GNSS-relevant route information 1, 2 or a result of the evaluation of a received item of GNSS-relevant route information 1, 2.

In block 222, as a measure, for example, an updating or non-updating of GNSS data can be carried out in a localization filter on the basis of a received item of GNSS-relevant route information 1, 2 or a result of the evaluation of a received item of GNSS-relevant route information 1, 2.

In block 223, as a measure, for example, a confidence value for describing the reliability of a localization result can be adjusted on the basis of a received item of GNSS-relevant route information 1, 2 or a result of the evaluation of a received item of GNSS-relevant route information 1, 2.

In block 224, as a measure, for example, a satellite selection can be carried out on the basis of a received item of GNSS-relevant route information 1, 2 or a result of the evaluation of a received item of GNSS-relevant route information 1, 2.

The system 10 can comprise, for example, a localization module 230 for determining localization results, such as the position, speed, and/or orientation of a vehicle 3. The localization module can furthermore be provided and set up to take into account at least one item of received GNSS-relevant route information 1, 2 or a result of the evaluation of at least one item of received GNSS-relevant route information 1, 2 during the determination or evaluation of one or more localization results.

In this way, individual or a plurality of the following advantages can be achieved: increased performance 231; greater availability 232; better continuity 233; and/or a more realistic uncertainty assessment 234.

For example, an algorithm can contribute to an exemplary implementation of the method described here and/or of a computer program specified here, which algorithm is suitable for receiving previous GNSS-relevant route information 1, 2 in order to improve positioning performance in critical situations. The prior information can be transmitted by an assistance system 4, and can be generated by means of a large number of hours of previous trips with a GNSS/INS-based localization sensor of a vehicle 3.

The algorithm can contain the following strategies for improving the tracking performance. The following strategies can be used in combination or individually:

Boosting: the variance of the GNSS measurements is boosted in order to obtain a lower weighting in the estimation of position, speed, location, and acceleration.

Lower weighting of the observation of satellites at a specific azimuth and a certain elevation on the basis of prior information about the environment.

Attenuation of multipath effects on the basis of the measurement of the multipath risk in the region with multipath potential.

No updating of the GNSS measurements in the filter: if a previous item of information indicates a blocking of GNSS updating, all remaining measurements will be rejected. For example, if the multipath risk level is high, the non-updating of GNSS measurements will be a reasonable choice.

Adjusting the protection level estimated by the filter.

Adjusting the tracking intelligence provider to take into account contaminated azimuth and elevation ranges. Information such as the distribution of the satellites in relation to the trajectory of the vehicle is used for tracking purposes.

Evaluating the quality of the satellites according to their position in the sky and the available prior information.

The method can thus advantageously be performed using an algorithm that is suitable for receiving previous GNSS-relevant route information in order to improve positioning performance under critical conditions. The prior information can be obtained on the basis of a large number of hours of previous trips with a GNSS/INS-based localization sensor. A boost in the variance of GNSS observation can be performed in order to reduce its contribution. GNSS measurements in the filter cannot be updated if a previous item of information or prior information triggers blocking of GNSS updating. In this context, the previous covariance can be obtained from the assistance system, the previous position and speed from the time updating of the Kalman filter. Furthermore, in the case of non-updating of GNSS measurements, all remaining measurements can be discarded.

The protection level estimated by the filter can in particular be adjusted on the basis of the information provided by the assistance system. The tracking intelligence provider can be updated to take into account a contaminated azimuth and elevation range.

Furthermore, satellites in the contaminated azimuth or elevation range may be given a poor rating and be ranked downward in the list of all satellites in order to achieve better performance of RAIM. The observation of satellites at a specific azimuth or a specific elevation can be weighted less strongly on the basis of the prior information about the environment. For example, a boost can be performed on the basis of received flags in the region with a great multipath potential in order to reduce the multipath effect.

What is claimed is:

1. A method for taking provided Global Navigation Satellite System (GNSS)-relevant route information into account in a GNSS-based localization of a vehicle, the method comprising the following steps:

a) receiving the provided GNSS-relevant route information;

b) evaluating at least one item of the provided GNSS-relevant route information; and c) taking into account the at least one item of the provided GNSS-relevant route information or a result of the evaluation of the at least one item of the provided GNSS-relevant route information during determination or evaluation of one or more localization results, wherein a weighting of the GNSS influence on at least one localization result is carried out based on the at least one item of the provided GNSS-relevant route information or a result of an evaluation of the at least one item of the provided GNSS-relevant route information.

2. The method according to claim 1, wherein the GNSS-relevant route information is obtained from a higher-level and/or vehicle-external management system.

3. The method according to claim 1, wherein the GNSS-relevant route information contains at least one interference indicator for describing at least one interference influence on GNSS reception in the area of a geographical position and/or on a route section, and/or the interference indicator is evaluated in step b) from the GNSS-relevant route information.

4. The method according to claim 1, wherein, in step c), a confidence value for describing a reliability of a localization result is adjusted on based on the at least one item of the provided GNSS-relevant route information or a result of the evaluation of the at least one item of the provided GNSS-relevant route information.

5. A method for taking provided Global Navigation Satellite System (GNSS)-relevant route information into account in a GNSS-based localization of a vehicle, the method comprising the following steps:

a) receiving the provided GNSS-relevant route information;

b) evaluating at least one item of the provided GNSS-relevant route information; and c) taking into account the at least one item of the provided GNSS-relevant route information or a result of the evaluation of the at least one item of the provided GNSS-relevant route information during determination or evaluation of one or more localization results, wherein, in step c), an updating or non-updating of GNSS data is carried out in a localization filter based on the at least one item of the provided GNSS-relevant route information or a result of the evaluation of the at least one item of the provided GNSS-relevant route information.

6. A method for taking provided Global Navigation Satellite System (GNSS)-relevant route information into account in a GNSS-based localization of a vehicle, the method comprising the following steps:

a) receiving the provided GNSS-relevant route information;

b) evaluating at least one item of the provided GNSS-relevant route information; and c) taking into account the at least one item of the provided GNSS-relevant route information or a result of the evaluation of the at least one item of the provided GNSS-relevant route information during determination or evaluation of one or more localization results, wherein, in step c), a satellite selection is carried out based on the at least one item of the provided GNSS-relevant route information or a result of the evaluation of the at least one item of the provided GNSS-relevant route information.

7. A non-transitory machine-readable storage medium on which is stored a computer program for taking provided Global Navigation Satellite System (GNSS)-relevant route information into account in a GNSS-based localization of a vehicle, the computer program, when executed by a computer, causing the computer to perform the following steps:

a) receiving the provided GNSS-relevant route information;

b) evaluating at least one item of the provided GNSS-relevant route information; and c) taking into account the at least one item of the provided GNSS-relevant route information or a result of the evaluation of the at least one item of the provided GNSS-relevant route information during determination or evaluation of one or more localization results, wherein a weighting of the GNSS influence on at least one localization result is carried out based on the at least one item of the provided GNSS-relevant route information or a result of an evaluation of the at least one item of the provided GNSS-relevant route information.

8. A system a Global Navigation Satellite System (GNSS)-based localization of a vehicle, the system configured to take provided GNSS-relevant route information into account in the GNSS-based localization of the vehicle, the system configured to:

a) receive the provided GNSS-relevant route information;

b) evaluate at least one item of the GNSS-relevant route information; and c) take into account the at least one item of the provided GNSS-relevant route information or a result of the evaluation of the at least one item of the provided GNSS-relevant route information during determination or evaluation of one or more localization results, wherein a weighting of the GNSS influence on at least one localization result is carried out based on the at least one item of the provided GNSS-relevant route information or a result of an evaluation of the at least one item of the provided GNSS-relevant route information.

* * * * *